United States Patent [19]

Graziani

[11] Patent Number: 5,031,512
[45] Date of Patent: Jul. 16, 1991

[54] CROSSHEAD FOR RECIPROCATING PISTON MACHINES, IN PARTICULAR FOR RECIPROCATING COMPRESSORS

[75] Inventor: Franco Graziani, Florence, Italy

[73] Assignee: Nuovopigone - Industrie Meccaniche E Fonderia S.p.A., Florence, Italy

[21] Appl. No.: 507,158

[22] Filed: Apr. 10, 1990

[30] Foreign Application Priority Data

Apr. 21, 1989 [IT] Italy .................. 20253 A/89

[51] Int. Cl.⁵ .............................. F01B 9/00
[52] U.S. Cl. ................. 92/139; 92/165 R; 74/44; 384/11
[58] Field of Search ............... 92/139, 129, 165, 176; 74/44, 45, 49; 384/11; 123/48 B

[56] References Cited

U.S. PATENT DOCUMENTS

| 2,252,987 | 8/1941 | Schniekart | 92/139 |
| 4,422,414 | 12/1983 | Moeller | 123/48 B |
| 4,729,249 | 3/1988 | Besic | 74/44 |
| 4,872,395 | 10/1989 | Bennitt et al. | 74/44 |
| 4,913,033 | 4/1990 | Bernas | 92/139 |

FOREIGN PATENT DOCUMENTS

| 1200615 | 9/1965 | Fed. Rep. of Germany | 384/11 |
| 1264882 | 3/1968 | Fed. Rep. of Germany | 384/11 |
| 885267 | 12/1961 | United Kingdom | 384/11 |

Primary Examiner—Edward K. Look
Assistant Examiner—Thomas Denion
Attorney, Agent, or Firm—Morgan & Finnegan

[57] ABSTRACT

A crosshead for reciprocating piston machines, in particular reciprocating compressors, wherein the piston rod fixing flange is connected directly to the connecting rod gudgeon pin by clamping screws passing through corresponding holes in the flange and crosshead body and engaging in threaded bores provided in the gudgeon pin, the screws being tightened with a load much higher than the load which the connection has to transmit.

2 Claims, 2 Drawing Sheets

CROSSHEAD FOR RECIPROCATING PISTON MACHINES, IN PARTICULAR FOR RECIPROCATING COMPRESSORS

This invention relates to a new crosshead and more precisely to a new simple, practical and effective connection between the piston rod and the crosshead of a reciprocating piston machine, particularly a reciprocating compressor which, being no longer subject to thrust reversal, results in considerable reduction in weight and overall size of the crosshead with consequent higher operating speed.

BACKGROUND OF THE INVENTION

To convert the reciprocating rectilinear motion of the piston rod into rotary motion of a crankshaft in a reciprocating piston machine such as a reciprocating compressor, it is known to use a mechanism known as a crosshead, to one side of which said piston rod is connected, to its opposite side there being pivoted by means of a gudgeon pin the connecting rod of the crank mechanism which operates said crankshaft, said crosshead being provided with shoes slidable along rectilinear guides.

It is apparent that said connection between the piston rod and the crosshead must be of sufficient strength to transmit the considerable alternating stresses due to the gas thrust and inertia of the moving masses without suffering damage. Again, the current tendency towards increasingly high operating speeds gives rise to the serious problem of increasingly reducing the weight of the crosshead in that, especially in the case of machines with a high rotational speed, an even minimal reduction in the reciprocating masses results in a considerable reduction of the interial forces which stress the machanism, thus considerably improving the machine usability. Moreover, for certain applications, such as compressors to be mounted on transportable package units which must be of minimum possible overall dimensions, arrangements must be used which limit the overall size of the crank mechanism and thus the crosshead to a minimum. In the current state of the art the piston rod is normally connected to the crosshead either directly or indirectly via a fixing flange, so that the forces are in all cases transmitted by the rod to the body of the crosshead and from here to the gudgeon pin.

The main drawback of this arrangement is that as the crosshead body has to transfer the entire high load transmitted by the piston rod to the gudgeon pin, it must be of adequate from and strength, which immediately places unsurpassable limits on size and weight reduction of the crosshead, resulting in a corresponding limitation in terms of the size of the overall machine, thus affecting proper usability of the compressor, which because of the high reciprocating masses and consequent considerable forces of inertia cannot be used at the high operating speeds currently requested.

The object of the present invention is to obviate said drawback by providing a crosshead with a special connection to the piston rod by which the size and weight limitations of known arrangements are overcome, to allow high operating speeds.

This object is substantially attained in that the fixing flange to which the piston rod is connected by a hydraulic clamping system. said flange being optimized to resist bending by virtue of its shape and material, is connected directly to the connecting rod gudgeon pin by clamping screws passing through corresponding holes in the crosshead body and in said flange and engaging in threaded bores provided in the gudgeon pin, said screws being tightened with a load much higher than the load which the connection has to transmit.

In this manner, because of the direct connection between the flange to which the rod is fixed and the gudgeon pin, not only is the piston rod load transmitted to the clamping screws and thus to the gudgeon pin itself practically without involving the crosshead body which can therefore be reduced in weight and size, but the crosshead body is now made to work exclusively under compression as it is compressed between the flange and gudgeon pin by the clamping screws under a load such as to ensure that a sufficient residual compression load is maintained on the crosshead body under all operating conditions. An important consequence of this is that the connection between the crosshead and gudgeon pin is no longer subjected to thrust reversal as in the known art, with a resultant considerable reduction in the alternating fatigue loads which, as in well known, result in undesirable stresses which can also cause fracture and therefore require the crosshead to be overdimensioned for safety reasons. Again, the fact that the crosshead body remains permanently compressed by the load between the gudgeon pin and flange provided by the screws means that under all operating conditions the gudgeon pin remains permanently pressed against the crosshead body always on the same side, ie the piston rod side. The rear part, on the crankshaft side, of the gudgeon pin holding eyelet in the crosshead is therefore not even slightly stressed by the gudgeon pin, with the result that the corresponding part of the crosshead can be drastically reduced with consequent considerable reduction in the eight and overall size of the crosshead, to result in a crosshead suitable for high operating speeds.

SUMMARY OF THE INVENTION

Thus, according to the invention the purpose of the crosshead body is merely to act as a spacer between the flange and gudgeon pin and to carry the shoes, whereas the load transmission from the piston rod to the gudgeon pin is accomplished by external components (flange and through clamping screws) which can be better optimized to perform this function. The overall assembly is also lighter and less bulky than traditional arrangements and in particular it is important to note the reduced distance resulting from the invention between the gudgeon pin axis and the outline of the crosshead body on the crankshaft or crank mechanism side, this as already explained resulting from the fact that said part is never stressed by the gudgeon pin, in contrast to the situation in known arrangements in which said part has to withstand the force which the gudgeon pin transmits to the crosshead during the piston rod traction stage. Other conditions being equal, said reduced distance enables the distance between the crankshaft axis and gudgeon pin axis to be reduced, a problem particularly felt in machines with counterweights, and to thus obtain a smaller overall machine size.

A further considerable advantage of the reduced dimensions of the crosshead according to the invention appears particularly in its application to reciprocating machines with in-line opposing cylinders in which besides enabling the overall dimensions to be reduced it results in a structural symmetry about the crankshaft, in that such machines use a crosshead operated by two parallel connecting rods, this being an arrangement which allows a shorter overall length than usual single connecting rod crossheads and practically coinciding with that of the present invention. Again, the fact that the crosshead body remains constantly compressed means that it can be constructed of materials not of high fatigue strength and instead of low specific gravity such as light alloys, with a consequent further reduction in the reciprocating masses.

The invention is described in greater datail hereinafter with reference to the accompanying drawings, which illustrate a preferred embodiment thereof by way of non-limiting example only, in that technical or constructional modifications may be made thereto but without leaving the scope of the present invention. In said drawings:

Figure 1:
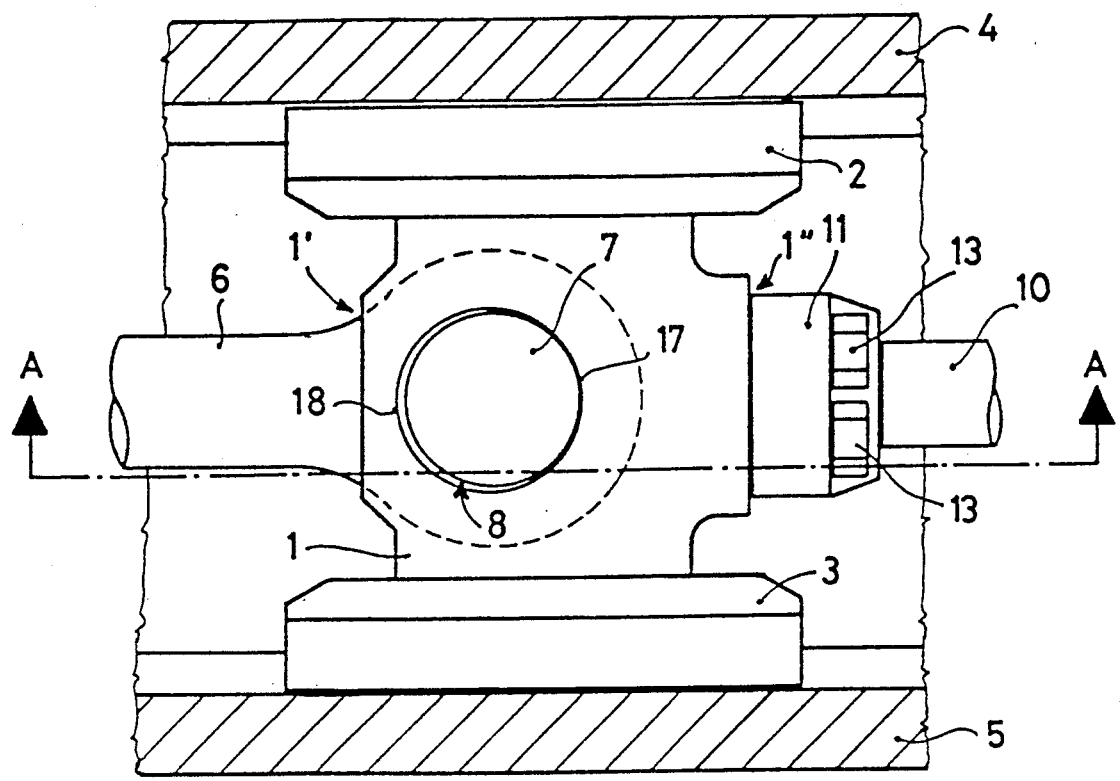
FIG. 1 is a longitudinal view of a crosshead constructed in accordance with the invention.
Figure 2:
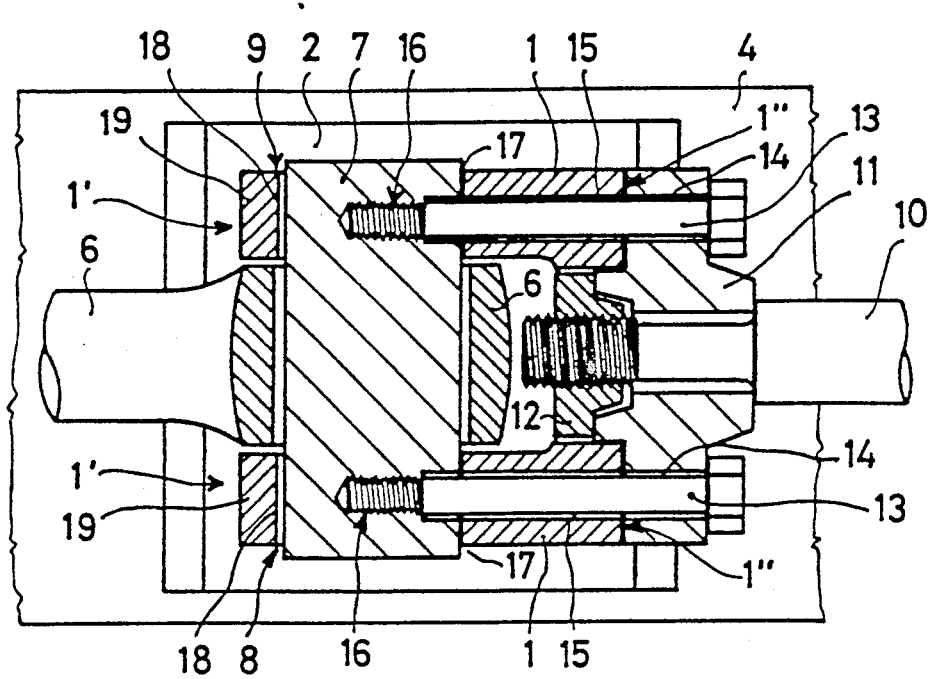
FIG. 2 is a section therethrough on the line AA of FIG. 1.
Figure 3:
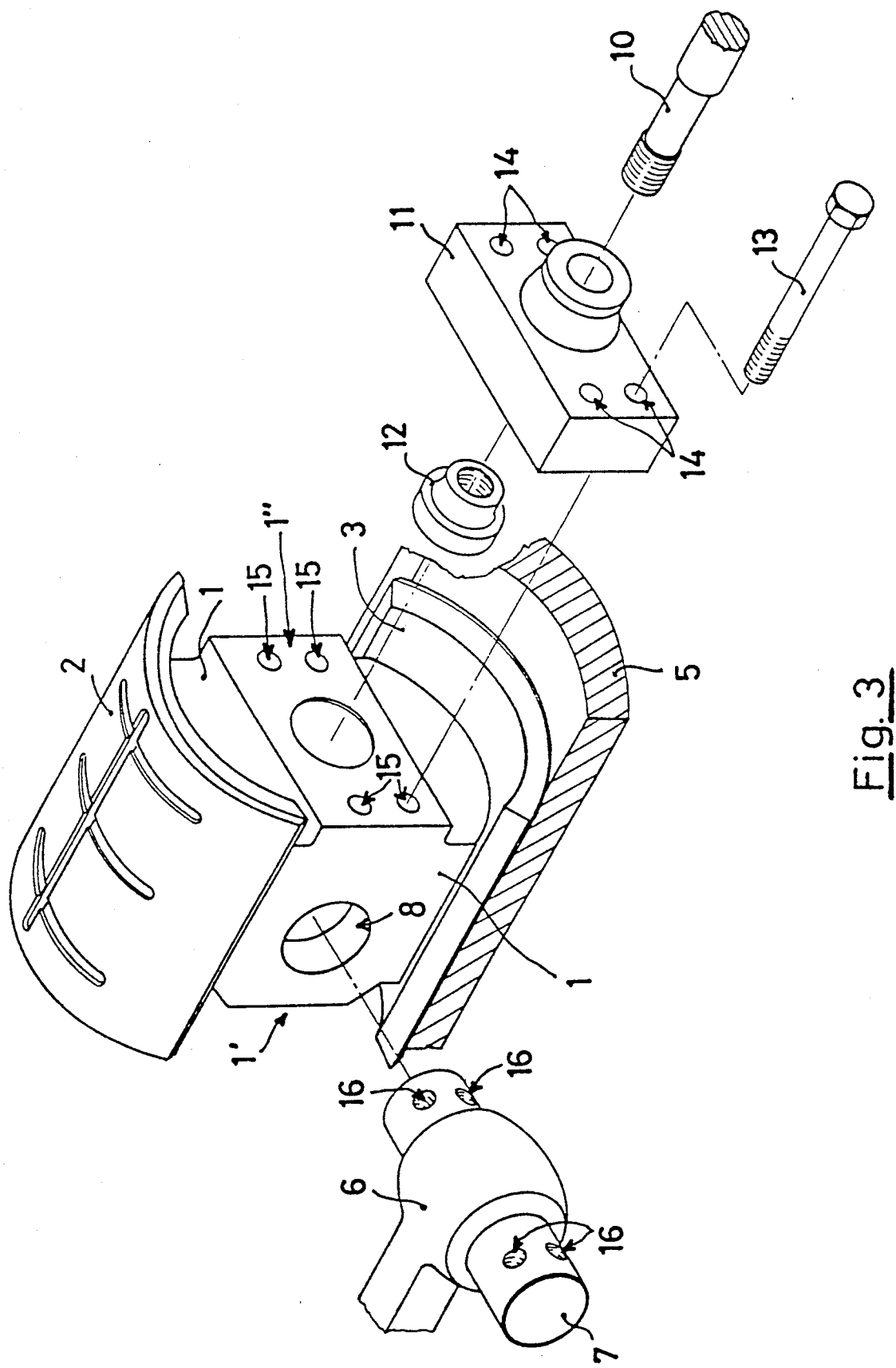
FIG. 3 is an exploded perspective view of the crosshead of FIG. 1 but to an enlarged scale, and omitting the upper guide for reasons of clarity.

In the figures the reference numeral 1 indicates the crosshead body which is provided with two curved shoes 2 and 3 arranged to slide along corresponding rectilinear guides 4 and 5. The connecting rod 6 of the crank mechanism operating the crankshaft, not shown, of a reciprocating piston machine is pivoted on the side 1' of the crosshead body 1 by a gudgeon pin 7 inserted into opposing housing eyelets 8 and 9 provided in the side walls of the body 1, whereas the opposite side 1" of the crosshead body 1 houses the piston rod 10 of said reciprocating machine. Said piston rod 10 is locked onto a fixing flange 11 by the hydraulically tightened nut 12, the flange 11, which rests directly against said 1" of the crosshead body 1, being connected directly to said gudgeon pin 7 by clamping screws 13 which pass through corresponding holes, 14 and 15 respectively, in the flange 11 and body 1, to engage in threaded bores 16 provided in the gudgeon pin 7. Finally, the screws 13 are tightened with a load much greater than the operating load which has to be transmitted from the piston rod to the connecting rod or vice versa so that during the entire operation the gudgeon pin 7 remains permanently pressed against the front 17 of the containing eyelets 8 and 9, whereas the rear 18 of said eyelets is never stressed by the gudgeon pin, thus allowing a drastic reduction in the part 19 of the crosshead body 1 (see specifically FIG. 2).

What is claimed is:

1. A crosshead for reciprocating piston machines, comprising a crosshead body to one side of which a piston rod of a reciprocating machine is connected by a fixing flange to which said piston rod is coupled by a hydraulically tightened clamping system, and to its opposite side there being pivoted by means of a gudgeon pin a connecting rod of a crank mechanism which operates a crankshaft, said crosshead being provided with shoes slidable along rectilinear guides. characterised in that said fixing flange is connected directly to said connecting rod gudgeon pin by clamping screws passing through corresponding holes in the crosshead body and in said flange and engaging in threaded bores provided in the gudgeon pin, said screws being tightened with a load much higher than the load which the connection has to transmit.

2. A crosshead for reciprocating piston machines according to claim 1, wherein the machines are reciprocating compressors.

* * * * *